United States Patent
Grogan

(10) Patent No.: US 8,760,641 B2
(45) Date of Patent: Jun. 24, 2014

(54) WHEEL ALIGNMENT MEASURING

(76) Inventor: Terence Peter Grogan, Leeds (GB)

( * ) Notice: Subject to any disclaimer, the term of this patent is extended or adjusted under 35 U.S.C. 154(b) by 275 days.

(21) Appl. No.: 13/146,183

(22) PCT Filed: Jan. 25, 2010

(86) PCT No.: PCT/GB2010/000110
§ 371 (c)(1), (2), (4) Date: Jul. 30, 2011

(87) PCT Pub. No.: WO2010/084330
PCT Pub. Date: Jul. 29, 2010

(65) Prior Publication Data
US 2011/0279814 A1   Nov. 17, 2011

(30) Foreign Application Priority Data

Jan. 23, 2009 (GB) .................................. 0901058.8

(51) Int. Cl.
*G01B 11/26* (2006.01)
(52) U.S. Cl.
USPC ........ 356/139.09; 356/150; 356/153; 33/203; 33/288; 250/206.1
(58) Field of Classification Search
USPC ................................................... 356/139.09
See application file for complete search history.

(56) References Cited

U.S. PATENT DOCUMENTS

| | | | |
|---|---|---|---|
| 3,575,514 A * | 4/1971 | Baker | 356/155 |
| 4,444,496 A | 4/1984 | Dale, Jr. | |
| 4,854,702 A | 8/1989 | Stieff | |
| 4,918,821 A | 4/1990 | Bjork | |
| 5,048,954 A | 9/1991 | Madey et al. | |
| 5,488,471 A * | 1/1996 | McClenahan et al. | ... 356/139.09 |
| 5,532,816 A * | 7/1996 | Spann et al. | 356/139.09 |
| 6,286,990 B1 * | 9/2001 | De Zuazo Torres | 366/282 |
| 7,037,053 B2 * | 5/2006 | Matsumoto et al. | 409/234 |
| 7,710,555 B2 * | 5/2010 | Hoenke et al. | 356/155 |

FOREIGN PATENT DOCUMENTS

| | | |
|---|---|---|
| FR | 2304057 A1 | 10/1976 |
| FR | 2326682 A1 | 4/1977 |
| GB | 815652 A | 7/1959 |
| GB | 1577521 A | 10/1980 |
| GB | 2160970 A | 1/1986 |

OTHER PUBLICATIONS

United Kingdom Intellectual Property Office, U.K. Patent Application No. GB1001153.4, "Search Report," dated Feb. 26, 2010.

* cited by examiner

*Primary Examiner* — Luke Ratcliffe
*Assistant Examiner* — Samantha K Abraham
(74) *Attorney, Agent, or Firm* — Edwin D. Schindler

(57) ABSTRACT

A method for determining the alignment of a pair of vehicle wheels includes the steps of positioning a beam projecting device consecutively on each wheel, in the same angular relationship to the wheel, and projecting a beam to a receptor, which is located in a predetermined angular relationship the other wheel. The projecting device, the receptor or both is utilized to determine the angle between the beams and the angle is related to the alignment of the pair of wheels; the receptor being maintained in the same position for each beam projection.

20 Claims, 2 Drawing Sheets

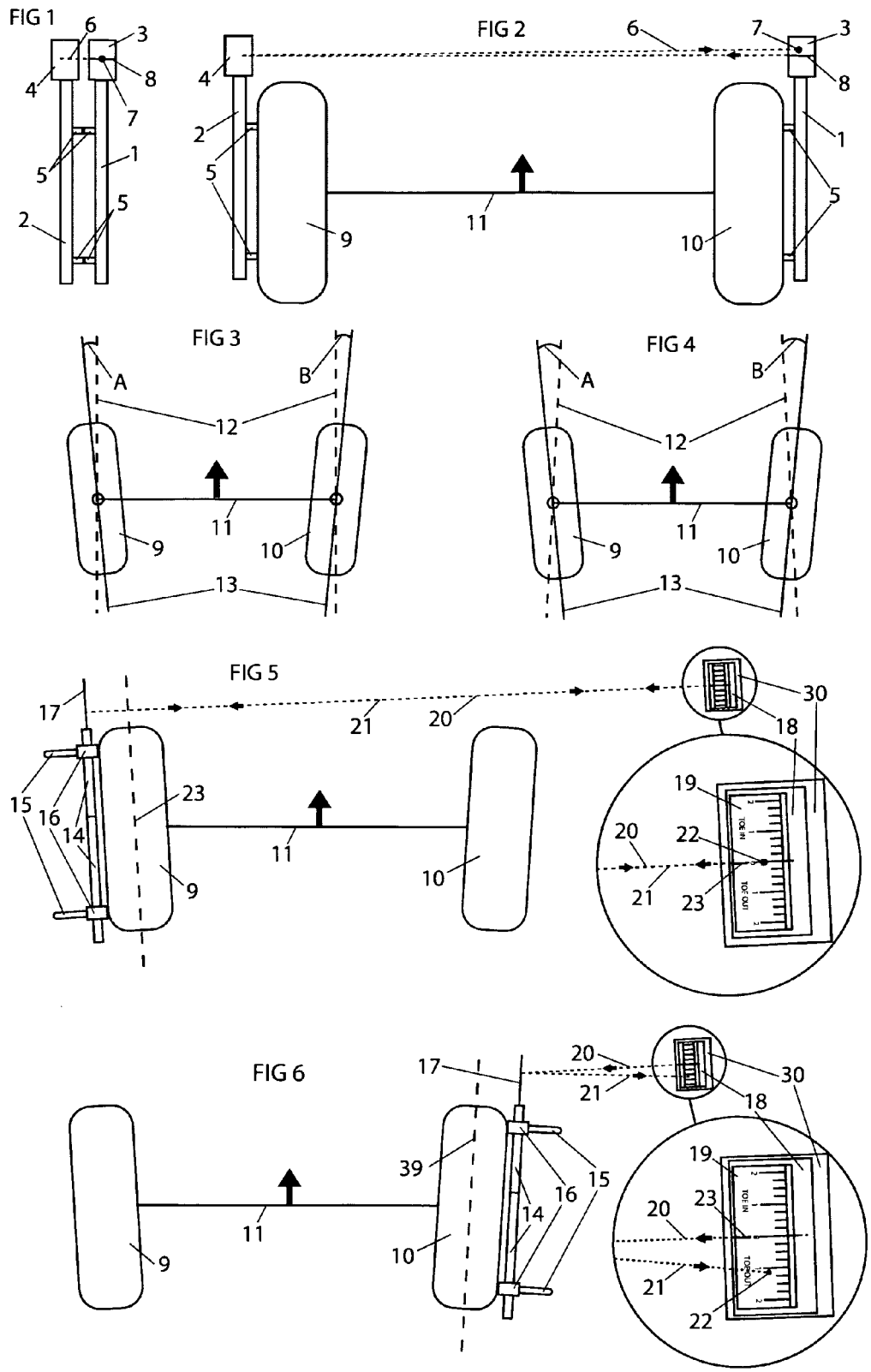

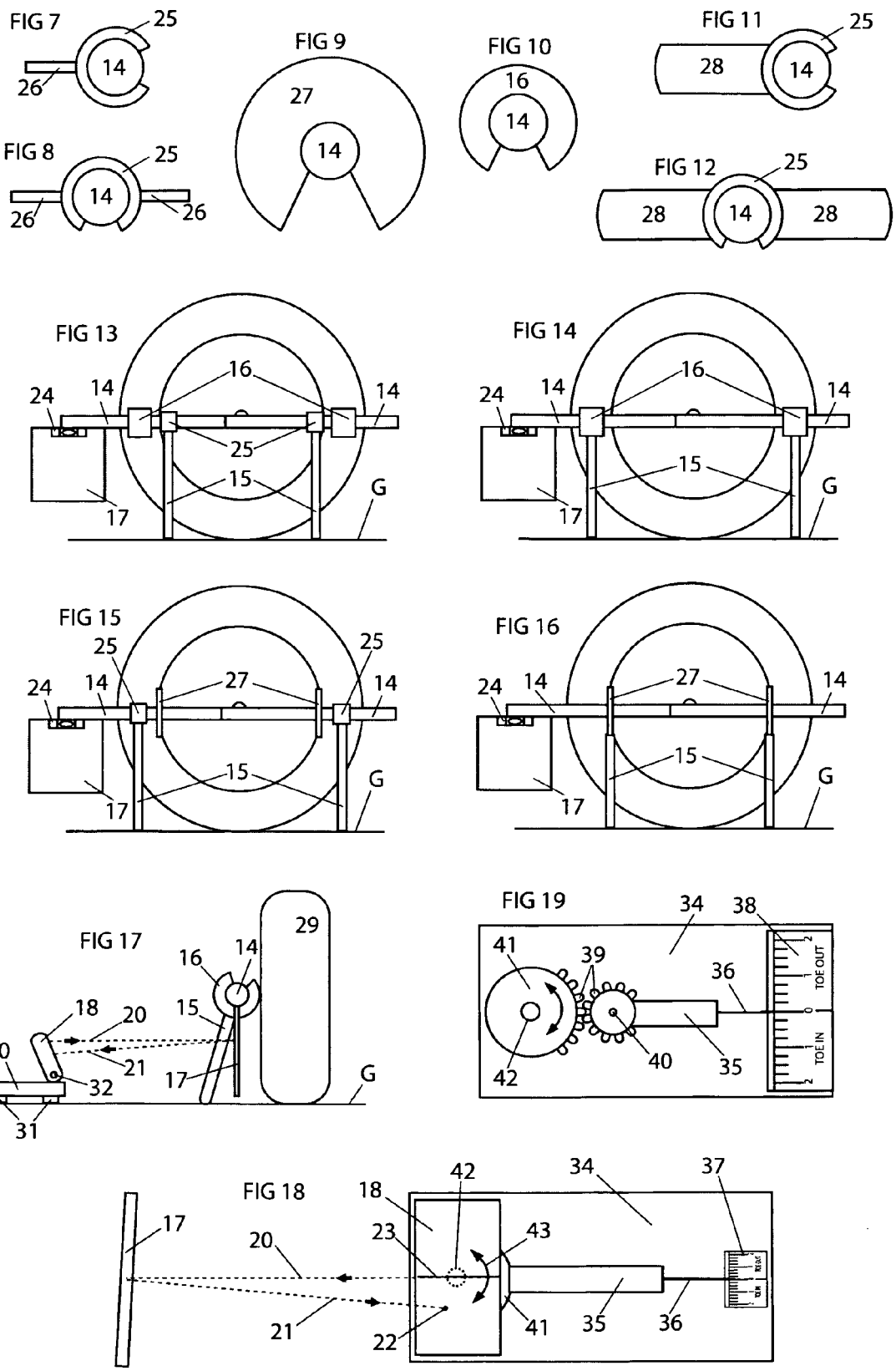

WHEEL ALIGNMENT MEASURING

FIELD OF THE INVENTION

The invention is concerned with a method and apparatus for determining vehicle wheel alignment.

BACKGROUND OF INVENTION

There is presently no cost effective compact solution for the motorist to check vehicle wheel alignment toe angle. Commercial gauges are very expensive and most laser optical versions are based on the method described in GB1395882. They all use a basic principle of calibration to the parallel plane and rely on maintaining this calibration when used to check a vehicle's wheels deviation from the parallel plane.

All existing laser optical methods use two planar gauges, consisting of long spans that are single strong parts, to maintain calibration. They are heavy and difficult to store. These spans are the main obstacle to providing the benefit of a compact solution for home storage. Splitting of the spans creates a fundamental problem with existing methods because span parts cannot be relied on to fit together with the same straightness every time thus creating a high risk of a user using un-calibrated apparatus and getting inaccurate results. Commercial gauges are also prone to easy mis-calibration, being pre-calibrated by placing gauges face to face. Over this short distance any small misjudgement is multiplied many times when gauges are moved far apart on a vehicle. Some more expensive gauges use a rig to hold gauges further apart to minimise this risk. This is better but does not provide a low cost, compact solution.

The spans require further components to access the plane of the wheels and devices at one end to facilitate the intended method. Some stand on the floor and are provided with vertical arms and others are arranged for hanging on or clamping to the wheels. Height, width and level adjustment require separate technical features.

STATEMENTS OF INVENTION

According to the present invention there is provided a method for determining the alignment of a pair of vehicle wheels, comprising positioning a beam projecting device consecutively on each wheel, in the same angular relationship to the wheel, and projecting a beam to a receptor which is located in a predetermined angular relationship to the other wheel, utilising said projecting device and/or said receptor to determine the angle between said beams and relating said angle to the alignment of the pair of wheels, the receptor being maintained in the same position for each beam projection.

The present invention also provides apparatus for determining the alignment of a pair of wheels comprising an elongate member provided with a plurality of laterally extending means for contacting the wheel at spaced apart positions therebetween, said elongate member comprising at least two elongate parts and means for connecting said parts to the other in longitudinal relationship.

Preferably, the connecting means include means for adjusting the length of the elongate member and/or the distance between wheel contact means.

The present invention further provides apparatus for determining the alignment of a pair of wheels comprising an elongate member provided with a plurality of laterally extending means for contacting the wheel at spaced apart positions therebetween, said elongate member being provided with a pair of leg members for supporting said elongate member in an elevated position.

Preferably, leg connection means are provided to secure the leg members to the elongate member.

Preferably, the leg connection means permit the leg members to be secured to the elongate member at different separations therealong.

Preferably, the leg connection means permits the leg members to angularly adjust at said connection to the elongate member.

Preferably, the connecting means are transversely adjustable with regard to the elongate member.

Preferably, the contact means extend transversely on opposite sides of the elongate member.

Preferably, the contacting means are provided on the leg members.

Preferably, the contacting means are in the form of transversely extending pins, transversely extending collars or collars having transversely extending sections.

Accordingly, the present invention provides the general motorist with the benefits of compact, low cost apparatus to quickly, simply and accurately check the toe angle of the pair of vehicle wheels.

The sectional span feature makes it compact for storage and portable should the motorist have to travel to suitable level ground, a necessity for an accurate toe angle check.

There is no possibility of the sectional span maintaining any degree of accuracy as a result of periodic calibration in comparison to the single part strong spans of known methods and apparatus.

Use of varying force on connecting links is sufficient to make span parts lock together with different overall straightness. However in the case of the present invention the span will rapidly lock together and can be used immediately to perform an accurate toe angle check with no concern about prior calibration. The method automatically compensates at every use for even the smallest changes in the overall straightness of the span, as compared with the previous use.

The sectional span feature can be made telescopic by the use of different size tubes that have suitable locking means.

The method of the invention also automatically achieves a superior state of calibration, with the apparatus adjusted to suit wheel size, in situ on the vehicle. It is superior due to the great distance between the devices, overcoming the problem of easy mis-calibration with known methods. Any small misadjustment remains small.

The method of the invention can be used independently of the sectional span features and the new prop mounted design of the present invention. Thus, the method can be used on known apparatus for single part spans and will provide the feature of superior calibration.

The present invention allows the use of a new single, reversible planar gauge with a small remote device, eliminating the possibility of a user placing an uncalibrated pair of gauges onto a vehicle and obtaining incorrect results. The remote device incorporates said pivoting laser that provides quick adjustment between working height and folding for compact storage, as well as easy fine adjustment of the laser level, removing any need for adjustable feet. The remote unit is placed at a specified distance from a wheel, allowing a simple scale on the laser target unit to display results accurately on any size of car, impossible with existing methods that all work at the width of the vehicle. Vehicles are of different widths but a scale can only be accurate at a specified distance. An actuated angle calculator, preferably with an exaggerated scale for easy reading, can be incorporated to allow the unit to be placed at any convenient distance.

The present invention uses a span with prop legs which radically overcomes the size and technical complexity of known methods and apparatus. A rigid span will have two props installed with anti-slip feet, utilising gravity to hold the span against the wheel. The prop span provides easy height adjustment and, with adjustable connections, provides level and vertical angular adjustment of any device mounted at the end of the span.

The present invention provides new planar reference devices in the form of planar contact collars that tolerate rotation and are movable along the span to suit wheel size. Pairs of collars of different dimensions will suit tyre wall reference or wheel rim reference and both can be supplied to offer full flexibility. Props incorporating planar contact collars may be provided so that two identical parts provide all the features which are required.

BRIEF DESCRIPTION OF THE DRAWINGS

The accompanying drawings are as follows:—

FIGS. 1 and 2 illustrate a prior art calibration method;

FIGS. 3 and 4 further illustrate the prior art method;

FIGS. 5 and 6 illustrate a method and apparatus in accordance with the present invention;

FIGS. 7 to 12 show planar reference devices which can be used with the method and apparatus of the present invention;

FIGS. 13 to 16 show various combinations, mounted to a wheel, of use in the present invention;

FIG. 17 shows how laser level adjustment is achieved in a method according to the present invention; and FIGS. 18 and 19 show alternative options of actuated angle calculators which may be used in the method and apparatus of the present invention.

DETAILED DESCRIPTION OF THE INVENTION

The present invention will now be described, by way of examples only, with reference to the accompanying drawings.

FIG. 1 illustrates the separate process of calibrating an existing pair of gauges 1 and 2 with device ends, laser/target 3 and mirror 4. Gauges are placed with planar reference pins 5 contacting face to face to set zero. Laser 6 goes from device 3 to mirror 4 reflects back to target on 3 and is adjusted to line up laser dot 7 with zero line 8.

FIG. 2 shows how existing methods are prone to easy mis-calibration. Any small misjudgement in calibration method from FIG. 1 is multiplied many times when gauges are moved apart to the size of a vehicle. Although wheels 9 and 10 are parallel, the gauges show laser dot 7 is not still at zero line 8 as it should be.

FIG. 3 shows how existing gauges work. Wheels 9 and 10, on axle 11 are aligned in the forward direction toe out. The bold arrow indicates the forward direction. The dotted lines 12 represent the planes at which gauges read zero and are parallel if existing gauges are accurately calibrated. Solid lines 13 represent the planes of the wheels to which gauges measure. The sum of angles A and B is the correct angular measurement of the wheels deviation from parallel.

FIG. 4 shows the same toe out wheels from FIG. 3 and how a small misjudgement in existing gauges calibration process (FIG. 1) is multiplied (FIG. 2). As a result, gauge zero lines 12 are not parallel. Wheel plane lines 13 are the same, angles A and B are increased and will produce an inaccurate result.

FIG. 5 shows a method of the present invention. A reversible planar gauge is mounted to wheel 9. The mirror 17 is in a forward perspective of the wheels. A level bubble will assist levelling the gauge. The remote unit 30 has a fold up laser/target unit 18 that emits a laser beam from the zero line 23 on scale 19. It is placed on the ground on the opposite side of the vehicle at a specified distance from wheel 10. The laser is turned on and the unit position is physically adjusted so that the laser 20 is reflected straight back on itself 21 from mirror 17. Laser dot 22 is in line with zero line 23. Laser level is adjusted by pivoting features of the laser/target unit and mirror.

Referring to FIG. 6, the planar gauge is now moved to the second wheel 10 and placed using the reverse planar reference points 16, to the same level as when on wheel 9. The state of alignment is now clearly and accurately indicated by laser dot 22 on the scale 19. An actuated angle calculator can replace the scaled target. This is placed at a suitable distance, but is not required to be placed at a specific distance, from wheel 10.

To create a single reversible planar gauge the span must have planar reference points with the ability to be swapped or rotated from side to side or ideally have dual points installed equally on both sides of the span. This is the only technical feature required to make any existing or new style of apparatus into a reversible gauge.

FIG. 7 shows a design combining traditional planar reference pins 26 for contacting the wheel rims with a flexible clip 25 that allows snap on fitting and adjustment along the span 14 as well as contact pin 26 around the span for the reversible gauge. FIG. 8 shows an alternative dual pin design ideal for the reversible gauge.

FIG. 9 shows a new technical feature for planar reference points. The pins are replaced by a circular collar 27. Made from suitable material it can snap onto the span bar 14 and being of a circular design keeps the span evenly spaced from the planar contact point eliminating any rotational effect from adjusting the height and level of a span. It provides dual sided points ideal for a reversible gauge. Collar 27 has a radius suitable to contact the wheel rims and maintain clearance of any other part of the gauge from contacting any other part of the wheel or tyre and is narrow to suit accurate location on the edges of the wheel rims. FIG. 10 shows collar 16, the smaller radius being suitable to contact the tyre wall and maintain clearance of any other part of the gauge from contacting any other part of the wheel or tyre but is wider to suit accurate location on the tyre wall. FIG. 11 shows how just a section of the collars can be used to form blades 28 that function more like the pins in FIGS. 8 and 9 but still maintain a degree of rotational tolerance. FIG. 12 shows an alternative dual blade design ideal for the reversible gauge. The new planar reference devices can be independent components, connected to the props, or incorporated into the props to form a single part. Collars and blades can be of any suitable dimensions that testing may dictate.

FIG. 13 shows a side view of the planar gauge mounted to a wheel. The new sectional span 14 incorporates the compacting feature, having more than one part that lock together rigidly for use and then unlock for compact storage. Male and female parts screw together connections meet requirements and allow an optional extension for larger vehicles. Different size tubes with suitable locking means can be provided to use telescopic compacting. The span is mounted against the wheel using the new method of props 15 standing on the ground G. The props lean into the wheel to utilise gravity. Directly fixed props provide this benefit, but an adjustable connection at 25 will provide adjustment of a pivoting nature and/or adjustment along the span. Separate props require their own clip on connection 25. A bubble level 24 and mirror 17 are installed at one end. The planar contact devices 16 are of a collar design to reference to the tyre walls and are separate from the props 15.

FIG. 14 shows an arrangement similar to FIG. 13 but with the collars 16 incorporated into the props 15 to form a single part.

FIG. 15 shows an arrangement similar to FIG. 13 but with the narrow wheel rim contact collars 27 separate from the props 15.

FIG. 16 shows an arrangement similar to FIG. 15 but with the collars 27 incorporated into the props 15. Any combination of separate or combined props and planar reference devices can be used.

FIG. 17 shows how a pivoting mounting at 32 of the laser/target unit 18 to remote base 30 allows level adjustment of laser 20. Pivoting between span 14 at collar part 16 allows vertical angular adjustment of mirror 17 to level the reflected laser 21. Parts 31 are unit feet of which three provide stability.

FIG. 18 shows an actuated angle calculator incorporated into the remote unit as it would appear in the final stage of the alignment check shown by FIG. 6. No scale is used on laser/target unit 18, just a central zero line 23. The laser/target unit is mounted to a carrier 41 which is pivotally connected beneath at point 42 to the larger base 34. The carrier has an actuator arm 35 with a pointer 36 that points at an adjacent scale 37. The pointer is set to zero on the scale before use. On completion of a toe angle check any mis-alignment will again be indicated by laser dot 22 not being on zero line 23. The actuator 35 is moved rotating the laser/target unit, indicated by arrows 43, when laser dot 22 is back on zero line 23, the pointer will now indicate a result on the scale 37.

FIG. 19 shows how a movement exaggerator will allow a larger easy read scale 38. The laser/target unit is removed on this diagram to clearly show the carrier 41. A geared connection 39 between carrier 41 and actuator arm 35 which now has its own pivoting connection to the base at point 40 allows greater movement of the pointer against rotation of the carrier thus allowing the larger, easier to read results scale 38.

The laser/target unit 18 can alternatively be installed on the planar gauge and the mirror on the remote unit. In this embodiment an actuated angle calculator can be installed on the planar gauge or on the remote unit. The checking process can be in a forward or rearward perspective of the wheels and on alternative sides of the vehicle. Calibration can be on either wheel. Labelling of the scale will differ depending on combination used.

The invention claimed is:

1. A method for determining an alignment of a pair of vehicle wheels, comprising the steps of:
   placing a beam projecting and receiving device at a position remote from, and at one side of, a pair of vehicle wheels;
   positioning a beam reflecting device against a first vehicle wheel of said pair of vehicle wheels;
   projecting a beam from said beam projecting and receiving device to said beam reflecting device, so that a first reflected beam is projected back to said beam projecting and receiving device;
   subsequently positioning said beam reflecting device against a second vehicle wheel of said pair of vehicle wheels with an angular relationship between said beam reflecting device and each of said first vehicle wheel and said second vehicle wheel being equal;
   projecting a beam from said beam projecting and receiving device to said beam reflecting device, so that a second reflected beam is projected back to said beam projecting and receiving device, while maintaining said beam projecting and receiving device at said position;
   determining an angle between said first reflected beam and said second reflected beam; and,
   determining the alignment of said first vehicle wheel and said second vehicle wheel of said pair of vehicle wheels based upon said angle between said first reflected beam and said second reflected beam and excluding a pre-calibration procedure.

2. The method for determining an alignment of a pair of vehicle wheels according to claim 1, wherein said beam reflecting device includes an elongate member having a plurality of laterally extending means for contacting either said first vehicle wheel or said second vehicle wheel at spaced apart positions therebetween, said elongate member including at least two elongate parts and means for connecting said elongate parts in a longitudinal relationship.

3. The method for determining an alignment of a pair of vehicle wheels according to claim 2, wherein said means for connecting includes at least one of means for adjusting a length of said elongate member and a distance between said means for contacting a wheel.

4. The method for determining an alignment of a pair of vehicle wheels according to claim 2, wherein said elongate member includes a pair of leg members for supporting said elongate member in an elevated position.

5. The method for determining an alignment of a pair of vehicle wheels according to claim 4, wherein said pair of leg members are securable to said elongate member at varying separations.

6. The method for determining an alignment of a pair of vehicle wheels according to claim 4, wherein said pair of leg members are angularly adjustable to said elongate member.

7. The method for determining an alignment of a pair of vehicle wheels according to claim 4, wherein said plurality of laterally extending means for contacting either said first vehicle wheel or said second vehicle wheel are provided on said pair of leg members.

8. The method for determining an alignment of a pair of vehicle wheels according to claim 2, wherein said plurality of laterally extending means for contacting either said first vehicle wheel or said second vehicle wheel are transversely adjustable relative to said elongate member.

9. The method for determining an alignment of a pair of vehicle wheels according to claim 2, wherein said plurality of laterally extending means for contacting either said first vehicle wheel or said second vehicle wheel extend transversely on opposite side of said elongate member.

10. The method for determining an alignment of a pair of vehicle wheels according to claim 2, wherein said plurality of laterally extending means for contacting either said first vehicle wheel or said second vehicle wheel include transversely extending sections.

11. A method for determining an alignment of a pair of vehicle wheels, comprising the steps of:
    placing a beam reflecting device at a position remote from, and at one side of, a pair of vehicle wheels;
    positioning a beam projecting and receiving device against a first vehicle wheel of said pair of vehicle wheels;
    projecting a beam from said beam projecting and receiving device to said beam reflecting device, so that a first reflected beam is projected back to said beam projecting and receiving device;
    subsequently positioning said beam projecting and receiving device against a second vehicle wheel of said pair of vehicle wheels with an angular relationship between said beam projecting and receiving device and each of said first vehicle wheel and said second vehicle wheel being equal;

projecting a beam from said beam projecting and receiving device to said beam reflecting device, so that a second reflected beam is projected back to said beam projecting and receiving device, while maintaining said beam reflecting device at said position;

determining an angle between said first reflected beam and said second reflected beam; and, determining the alignment of said first vehicle wheel and said second vehicle wheel of said pair of vehicle wheels based upon said angle between said first reflected beam and said second reflected beam and excluding a pre-calibration procedure.

12. The method for determining an alignment of a pair of vehicle wheels according to claim 11, wherein said beam projecting and receiving device includes an elongate member having a plurality of laterally extending means for contacting either said first vehicle wheel or said second vehicle wheel at spaced apart positions therebetween, said elongate member including at least two elongate parts and means for connecting said elongate parts in a longitudinal relationship.

13. The method for determining an alignment of a pair of vehicle wheels according to claim 12, wherein said means for connecting includes at least one of means for adjusting a length of said elongate member and a distance between said means for contacting a wheel.

14. The method for determining an alignment of a pair of vehicle wheels according to claim 12, wherein said elongate member includes a pair of leg members for supporting said elongate member in an elevated position.

15. The method for determining an alignment of a pair of vehicle wheels according to claim 14, wherein said pair of leg members are securable to said elongate member at varying separations.

16. The method for determining an alignment of a pair of vehicle wheels according to claim 14, wherein said pair of leg members are angularly adjustable to said elongate member.

17. The method for determining an alignment of a pair of vehicle wheels according to claim 14, wherein said plurality of laterally extending means for contacting either said first vehicle wheel or said second vehicle wheel are provided on said pair of leg members.

18. The method for determining an alignment of a pair of vehicle wheels according to claim 12, wherein said plurality of laterally extending means for contacting either said first vehicle wheel or said second vehicle wheel are transversely adjustable relative to said elongate member.

19. The method for determining an alignment of a pair of vehicle wheels according to claim 12, wherein said plurality of laterally extending means for contacting either said first vehicle wheel or said second vehicle wheel extend transversely on opposite side of said elongate member.

20. The method for determining an alignment of a pair of vehicle wheels according to claim 12, wherein said plurality of laterally extending means for contacting either said first vehicle wheel or said second vehicle wheel include transversely extending sections.

* * * * *